Patented Aug. 23, 1949

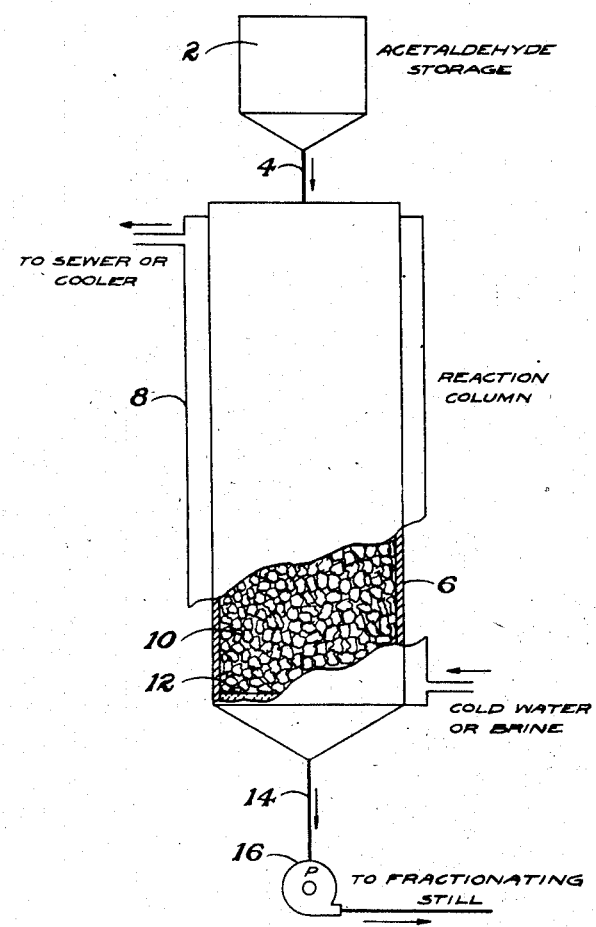

2,479,559

UNITED STATES PATENT OFFICE 2,479,559

PROCESS FOR PREPARATION OF PARALDEHYDE

Arthur A. Dolnick and Maxwell Potash, Philadelphia, Pa., assignors to Publicker Industries Inc., Philadelphia, Pa., a corporation of Pennsylvania Application August 16, 1947, Serial No. 768,946

10 Claims. (Cl. 260—340)

1

Our invention relates to a novel method for the preparation of paraldehyde. More particularly, it is concerned with a process that is readily adaptable to a continuous method for producing paraldehyde.

Previously, paraldehyde has been prepared by ordinary batch methods by allowing acetaldehyde to trimerize to paraldehyde in the presence of an acid catalyst such as sulphuric acid. This procedure, however, is quite time consuming and tedious owing to the fact that the reaction involved is highly exothermic, thus necessitating slow addition of the reactants and careful temperature control. On completion of the reaction, the mixture must be carefully neutralized in order to avoid decomposition of the paraldehyde on separation of the latter from the reaction mixture by distillation. While relatively good yields of paraldehyde can be obtained by the use of such a procedure, the overall efficiency thereof is comparatively low because of the relatively low yield of paraldehyde per unit volume of reactor space and the maintenance cost on equipment due to corrosion thereof by the acid catalyst.

We have now discovered a method for preparing paraldehyde which is free from the foregoing disadvantages and which can easily be designed to operate continuously and automatically, thus eliminating the necessity of the batch process technique previously used, and also eliminating the need for careful addition of base and subsequent neutralization of the catalyst. In accordance with our invention, we have found that paraldehyde can be readily prepared in good yields by contacting a fixed bed of an acid cation exchanger with acetaldehyde preferably at a temperature below the boiling point of the latter, although we have successfully converted acetaldehyde in the vapor phase to paraldehyde in the presence of acidic cation exchangers at temperatures in the neighborhood of 40 to 50° C. As previously indicated, however, we have found it preferable to effect the reaction in the liquid phase at temperatures below the boiling point of acetaldehyde, i. e., from about 15 to 20° C. The mixture of acetaldehyde and paraldehyde thus obtained may then be distilled directly without any neutralization step in as much as the mixture is free from objectionable concentrations of acid.

One of the more outstanding and surprising features of our invention is the fact that the time required to secure normal conversion and yield is only $\frac{1}{4}$ to about $\frac{1}{8}$ of the time required by batch processes to obtain comparable yields and conversions. Moreover, the unit volume of reactor

2 space necessary to obtain such yields in accordance with the process of our invention, is far less than that required to achieve the same results by batch process methods.

Our invention may be further understood by reference to the accompanying drawing partly in section which is a diagrammatical representation of a particular design and arrangement of apparatus we have found suitable. Acetaldehyde in tank 2 is conducted by gravity through line 4 into reaction column 6 surrounded by jacket 8 through which cold water or brine is circulated. Reaction column 6 is packed with an acidic cation exchanger 10 supported by porous plate 12. The reaction mixture which passes through porous plate 12 is conducted through line 14 by means of pump 16 to a suitable fractionation still and the paraldehyde thus produced, separated.

The rate at which acetaldehyde is introduced into the reaction column is largely controlled by the size of the column and the efficiency of the cooling system employed. In general, it may be said that the rate of introduction may vary from between about 30 ml. per hour per gram of resin to about 100 ml. per hour per gram of resin. In any event, the rate at which the acetaldehyde is added should be less than that necessary to increase the temperature of the reaction zone up to the boiling point of acetaldehyde. Since the reaction involved is quite exothermic it is highly desirable to employ an efficient cooling system to withdraw the heat of reaction as rapidly as possible from the reaction zone. This object may be readily accomplished by circulating cold water brine, or other suitable coolant through a jacket surrounding the reactor containing the exchanger. Also, if desired, the temperature within the reaction zone can be controlled to some extent, by mixing an inert material such as gravel, alundum, or the like, with the cation exchange resin.

As previously pointed out, one of the principal advantages in the preparation of paraldehyde in accordance with the process of our invention, resides in the fact that it is unnecessary to neutralize the reaction mixture prior to the separation of paraldehyde therefrom, by distillation. While it may be desirable to allow the effluent to contact a fixed bed of a suitable alkaline substance such as sodium carbonate or potassium carbonate in instances where free acid is present on the cation exchanger, the use of alkali generally in our process is unnecessary if the exchanger prior to use is washed thoroughly with alcohol, water, or other suitable liquid. Effluent mixtures obtained from reaction chambers employing exchanger so treated may readily be distilled without fear of decomposition of the paraldehyde. In this connection, care should also be exercised to prevent the occurrence of objectionable concentrations of acid in the acetaldehyde feed. Because of the fact that the aforementioned sources of acids do exist, it may generally be desirable to employ a small amount of an alkaline substance at the bottom of the reaction column to insure against the presence of any free acid in the effluent mixture when it is distilled. However, if all traces of acid are removed from the acetaldehyde prior to use, and the exchanger is thoroughly washed with alcohol to remove any free acid therefrom, no decomposition of the paraldehyde will be encountered on distillation.

The exchanger employed in carrying out the process of our invention may be any of the known acidic cation exchangers. As examples of such materials, there may be mentioned the sulfonated phenol formaldehyde resins known in the trade as "Amberlite I. R.-100," manufactured by Resinous Products and Chemical Company, the sulfonated coals, some of which are marketed to the trade under the name "Zeo-Karf," prepared by the Permutit Company, the "Duolite" resins, made by the Chemical Process Company, which are sulfonated condensation products of an aldehyde and a hydroxy aromatic compound, such as for example, a sulfonated phenol formaldehyde resin, and the like. In actual practice we have found resins of the aforesaid type to be extremely stable and to possess an exceptionally long life. In fact, certain of these materials have been employed for a period of several months, producing up to as much as 300 lbs. of paraldehyde per pound of resin without any observable decrease in activity.

Our invention may be further illustrated by the following specific examples:

*Example I*

Seven parts of Zeo-Karb H acidic cation exchanger (a sulfonated coal) is charged to a reaction column equipped with a cooling jacket. Water at 16° C. is circulated through the jacket and acetaldehyde is continuously passed through the resin bed at a rate of 200 ml. per hour. A total of 1300 parts of acetaldehyde is passed through the reaction column to secure paraldehyde in an average yield of 83%. No decrease in activity of the resin is observed during this period.

*Example II*

An acidic cation exchange resin known as "Duolite C-3," a sulfonated condensation product of a hydroxy aromatic compound and an aldehyde such as formaldehyde, is first screened to remove the small amount of fines present therein. The screened product thus obtained, having an average particle size of 20 to 60 mesh is next extracted with ethanol in a Soxhlet type extractor in order to reduce the concentration of colored impurities in the resin. The resin thus treated is then allowed to swell in butanol after which it is introduced into a glass reactor tube having an I. D. of 16 mm. to give a stationary catalyst bed 380 mm. high and occupying a volume of approximately 75 ml. Surrounding the reactor tube is a glass jacket equipped with a suitable inlet and outlet for cold water. After the reaction tube is thus made ready for use, acetaldehyde is introduced into the tube at the rate of 250 ml./hr. at 18° C. On analysis, the reaction mixture thus obtained is found to contain 75% paraldehyde. After recycling this mixture four more times, the yield of paraldehyde is increased to 92%.

It is to be specifically understood of course, that the foregoing examples are merely illustrative of our invention and the latter is to be in no way construed as being limited to a process as specifically set forth in said example. It will also be apparent that our invention is susceptible of numerous modifications without departing from the scope thereof. In general it may be said that any of such modifications of procedure which would normally occur to one skilled in the art in view of the foregoing disclosure, are to be construed as lying within the scope of our invention.

What we claim is:

1. In a process for the preparation of paraldehyde from acetaldehyde, the improvement which comprises contacting a fixed bed of an acidic cation exchanger with acetaldehyde at a temperature not higher than about 50° C. and separating the paraldehyde from the resulting effluent mixture.

2. In a process for the preparation of paraldehyde from acetaldehyde, the improvement which comprises contacting a fixed bed of an acidic cation exchanger with acetaldehyde at a temperature below its boiling point.

3. In a process for the preparation of paraldehyde from acetaldehyde, the improvement which comprises contacting a fixed bed of an acidic cation exchanger with acetaldehyde at a temperature below its boiling point, withdrawing from said exchanger bed a mixture comprising paraldehyde and acetaldehyde and recycling said mixture to produce a composition consisting largely of paraldehyde.

4. In a process for the preparation of paraldehyde from acetaldehyde, the improvement which comprises contacting a fixed bed of an acidic cation exchanger with acetaldehyde at a temperature below its boiling point and thereafter withdrawing a mixture containing paraldehyde.

5. In a process for the preparation of paraldehyde from acetaldehyde, the improvement which comprises contacting a fixed bed of an acidic cation exchanger comprising essentially a sulfonated condensation product of an aldehyde and a hydroxy aromatic compound with acetaldehyde at a temperature below its boiling point and thereafter withdrawing a mixture containing paraldehyde.

6. In a process for the preparation of paraldehyde from acetaldehyde, the improvement which comprises contacting a fixed bed of an acidic cation exchanger comprising essentially a sulfonated phenol-formaldehyde resin with acetaldehyde at a temperature below its boiling point and thereafter withdrawing a mixture containing paraldehyde.

7. In a process for the preparation of paraldehyde from acetaldehyde, the improvement which comprises contacting a fixed bed of an acidic cation exchanger comprising essentially a sulfonated coal with acetaldehyde at a temperature below its boiling point and thereafter withdrawing a mixture containing paraldehyde.

8. In a process for the preparation of paraldehyde from acetaldehyde, the improvement which comprises contacting an acidic cation exchanger comprising essentially a sulfonated condensation product of an aldehyde and a hydroxy aromatic compound with acetaldehyde at a temperature below its boiling point, withdrawing from said resin a mixture comprising acetaldehyde and paraldehyde, and repeating the aforesaid operation until the mixture so removed consists largely of paraldehyde.

9. In a process for the preparation of paraldehyde from acetaldehyde, the improvement which comprises contacting an acidic cation exchanger comprising essentially a sulfonated phenolformaldehyde resin with acetaldehyde at a temperature below its boiling point, withdrawing from said resin a mixture comprising acetaldehyde and paraldehyde and repeating the aforesaid operation until the mixture so removed consists largely of paraldehyde.

10. In a process for the preparation of paraldehyde from acetaldehyde, the improvement which comprises contacting an acidic cation exchanger comprising essentially a sulfonated coal with acetaldehyde at a temperature below its boiling point, withdrawing from said exchanger a mixture comprising acetaldehyde and paraldehyde, and repeating the aforesaid operation until the mixture so removed consists largely of paraldehyde.

ARTHUR A. DOLNICK.
MAXWELL POTASH.

REFERENCES CITED

The following references are of record in the file of this patent:

UNITED STATES PATENTS

| Number | Name | Date |
| --- | --- | --- |
| 1,763,326 | Reed | June 10, 1930 |
| 1,864,908 | Jaeger | June 28, 1932 |
| 1,994,714 | Johnson et al. | Mar. 19, 1935 |